T. R. HELLGREN.
MILLING CUTTER.
APPLICATION FILED FEB. 20, 1907.
998,174.
Patented July 18, 1911.
Fig. 1.
Fig. 2.
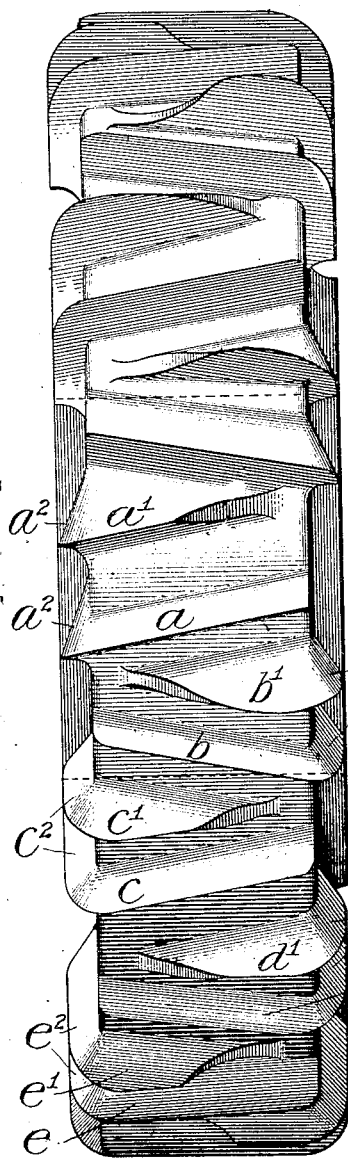
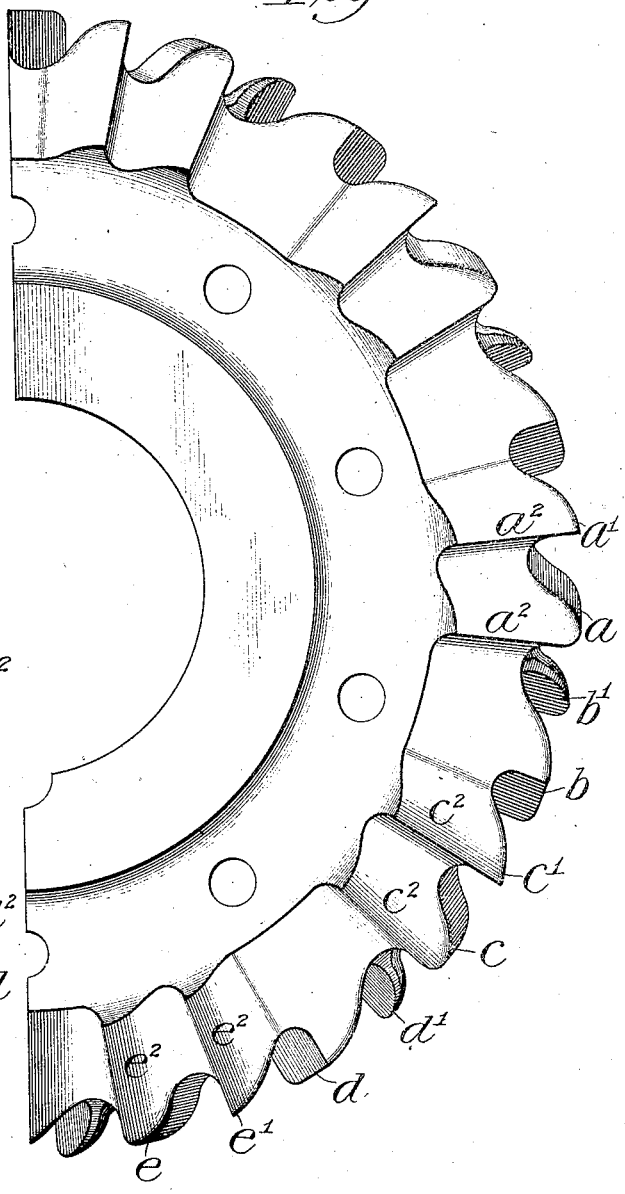
Witnesses:
Chas. E. Gaylord.
John Endere.
Inventor:
Tobias R. Hellgren,
By Thomas F. Sheridan,
Atty.

UNITED STATES PATENT OFFICE.

TOBIAS R. HELLGREN, OF AURORA, ILLINOIS.

MILLING-CUTTER.

998,174. Specification of Letters Patent. Patented July 18, 1911.

Application filed February 20, 1907. Serial No. 358,409.

*To all whom it may concern:*

Be it known that I, TOBIAS R. HELLGREN, a citizen of the United States, residing at Aurora, in the county of Kane and State of Illinois, have invented certain new and useful Improvements in Milling-Cutters, of which the following is a specification.

The object of my invention is to provide a new and improved milling cutter so constructed as to obviate the objectionable punching action incident to the use of milling cutters as ordinarily constructed, and to so construct the cutter that a more rapid cutting action will be secured than with previous cutters.

In the drawings—Figure 1 is an edge view of my improved cutter, and Fig. 2 is a side view of a part of the same.

It is common in milling cutters to place the teeth upon the periphery of the cutter in a position inclined to the path of movement of the surface of the cutter, and to incline all of the teeth in the same direction making them parallel. It has also been the practice to make all of the teeth extend completely across the periphery of the cutter. In my improved cutter I also incline the teeth to the path of movement of the cutter but do not incline them all in the same direction, nor do I make all of the teeth extend completely across the edge of the cutter. The cutters are made in the form of a circular disk or cylinder. For the purpose of defining the incline and position of the cutting teeth I shall refer to the elements of the cylinder upon which the teeth may be considered as superimposed, the elements as geometrically defined, being right lines lying in the surface of the cylinder and parallel to the axis thereof. By reference to the drawings, particularly to Fig. 1, it will be seen that I have arranged the cutting teeth in pairs, each pair comprising one tooth extending completely across the edge or face of the cutter and the other tooth extending partially across the face thereof. It will also be observed that the cutting edges of each of the pairs of teeth, designated upon the drawing respectively as $a$, $a'$, $b$, $b'$, $c$, $c'$, etc., are parallel, and that the complete teeth of each pair of parallel teeth are arranged forwardly of the incomplete tooth of the same pair. The teeth of each pair are extended upon the side of the cutter as indicated at $a^2$, $b^2$, $c^2$, etc., and that alternate pairs of teeth are extended upon one side of the cutter and the intervening pairs upon the opposite side. Each pair of teeth is continued upon the side of the cutter to which the partial tooth belonging to that pair is adjacent, the partial teeth of alternate pairs being upon one side of the cutter and the partial teeth of the intervening pairs upon the opposite side.

In operation the cutter is rotated in the direction toward which the cutting teeth are directed, that is, considering Fig. 2, in the direction of the hands of a clock. I have found that the rear partial tooth of each pair cuts a narrow shaving thus breaking the way for the following complete tooth which cuts a shaving of full width. Thus the tooth $b'$ cuts a narrow shaving preparing the way and lessening the burden upon the following full width tooth $a$ which it will be observed is inclined in the opposite direction to the tooth $b'$. I have found that with my improved cutter moving at a peripheral speed of from 45 to 50 feet, I am able to move the table at a much greater speed and make a cut of greater depth than with any prior form of milling cutter moving at the same or any other peripheral speed. I have also found that the durability of the cutter constructed in accordance with my invention is far greater than that of other cutters and that it may be operated continuously for long periods of time without becoming heated to an extent sufficient to be injurious.

I have illustrated the cutter as being formed of a single piece of metal with integral teeth and while I consider this form advantageous it obviously would be possible to construct a cutter according to my invention with separate teeth mounted upon the disk. I do not desire, therefore, that my invention be considered as restricted to either integral or separate teeth, but to cover teeth of the form defined in the claims whether constructed in either of these ways.

I claim:

1. A milling cutter in the form of a cylinder, the face of which is provided with pairs of teeth, each pair consisting of two parallel adjacent teeth inclined in one direction and one of said teeth extending only partially across the face of the cutter, alternate pairs of teeth being inclined in opposite directions.

2. A milling cutter in the form of a cylinder, the face of which is provided with pairs of teeth oppositely inclined to the elements of said cylinder, one tooth of each pair extending only partially across the face of the cutter, and the other tooth of each pair extending completely across the face.

3. A milling cutter provided upon its peripheral face with oppositely inclined pairs of spiral teeth, the teeth of alternate pairs extending toward the center on opposite sides of the cutter and one tooth of each pair extending only partially across the peripheral face of the cutter.

4. A milling cutter provided upon its peripheral face with oppositely inclined pairs of spiral teeth, the teeth of alternate pairs extending toward the center on opposite sides of the cutter and one tooth of each pair extending only partially across the peripheral face of the cutter, and the other tooth extending completely across the face of the cutter.

5. A milling cutter provided upon its peripheral face with oppositely inclined pairs of spiral teeth, each pair consisting of adjacent teeth, the rear tooth of each pair extending but partially across the face of the cutter, said partial tooth being continued upon the side of the cutter and the tooth behind said partial tooth being continued upon the opposite side of the cutter.

6. A milling cutter having alternate teeth extending completely across the face thereof, and intervening teeth extending but partially across the face, all of said teeth being inclined to their path of movement and each partial tooth having an inclination opposite to that of the complete tooth immediately behind it.

TOBIAS R. HELLGREN.

Witnesses:
WALTER A. SCOTT,
W. T. JONES.